United States Patent [19]

Fujii et al.

[11] 4,097,805

[45] Jun. 27, 1978

[54] FREQUENCY-SYNTHESIZER TYPE TRANSCEIVER

[75] Inventors: Motoyuki Fujii; Koji Yokota; Hajime Yashita, all of Tokyo, Japan

[73] Assignee: Torio Kabushiki Kaisha, Tokyo, Japan

[21] Appl. No.: 695,397

[22] Filed: Jun. 14, 1976

[30] Foreign Application Priority Data

Jun. 27, 1975 Japan .................................. 50-80214

[51] Int. Cl.² .............................................. H04B 1/40
[52] U.S. Cl. ......................................... 325/17; 325/20
[58] Field of Search ...................... 325/17, 18, 19, 20, 325/21

[56] References Cited

U.S. PATENT DOCUMENTS 3,944,925  3/1976  DeLaune ............................... 325/17
3,983,484  9/1976  Hodama ................................ 325/20

Primary Examiner—Richard Murray
Attorney, Agent, or Firm—Lane, Aitken, Dunner & Ziems

[57] ABSTRACT

This invention provides a frequency-synthesizer type transceiver having a voltage-controlled oscillator and means for comparing the phases of mixed frequency, whereby the voltage-controlled oscillator is regulated by signals resulting from the phase comparison to generate a controlled frequency serving as the local oscillator frequency for transmitting and receiving. The frequency-synthesizer type transceiver further includes a means for selectively switching from the one carrier frequency to the other to differentiate the transmitting and receiving frequencies.

2 Claims, 1 Drawing Figure

FREQUENCY-SYNTHESIZER TYPE TRANSCEIVER

BACKGROUND OF THE INVENTION

This invention relates to a frequency-synthesizer type transceiver.

There have been several types of frequency synthesizers for use in a local oscillator of a transceiver; such as may be broken down into the premixer type that is designed to provide a local oscillation frequency by mixing several oscillation frequencies, the premixer plus phase-locked-looped type (hereinafter "PLL"). However, these conventional devices have been found to have the following defects.

For example, the popularly used premixer type with two oscillator circuits: (1) involves substantial spurious response, (2) is incapable of intermediate frequency (hereinafter "IF") shift (which is described in detail below), and (3) is unable to make the receiving frequencies in the lower and upper side bands (hereinafter "LSB" and "USB," respectively) perfectly agree with each other with its one IF filter. The combined use of the PLL with the premixer type attenuates spurious response, but the other defects remain unimproved. In the premixer type with three or more oscillator circuits, both spurious response and oscillator leakage are great. Accordingly, two IF filters, for the LSB and USB, or a variable frequency oscillator (hereinafter "VFO") to effect frequency shift has been used.

SUMMARY OF THE INVENTION

The object of this invention is to eliminate the aforementioned defects and to provide a frequency-synthesizer type transceiver of the type that has a local oscillator circuit with reduced spurious response, is capable of IF shift, ensures perfectly agreed receiving frequencies for both LSB and USB by use of one IF filter, and therefore requires only one dial pointer. This is accomplished by regulating the voltage-controlled oscillator by signals resulting from the phase comparison to generate a controlled frequency serving as the local oscillator frequency for transmitting and receiving. The transceiver can further include a means for selectively switching from the one carrier frequency to the other to differentiate the transmitting and receiving frequencies.

BRIEF DESCRIPTION OF THE DRAWING

In FIG. 1, the blocks contain reference numerals which correspond to those used in the following description.

DETAILED DESCRIPTION OF A PREFERRED EMBODIMENT

Figure 1:
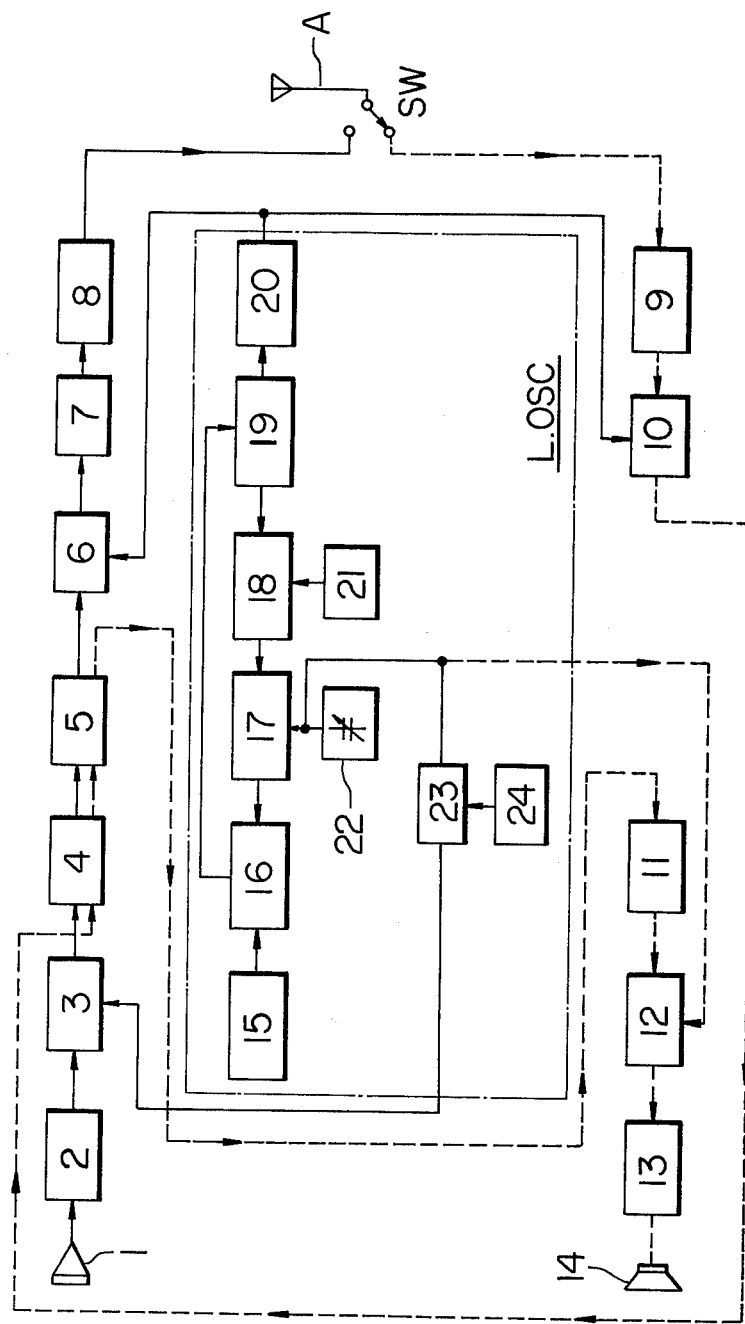
FIG. 1 is a block diagram showing an embodiment of the invention.

Before describing an embodiment of this invention with reference to the accompanying drawing, a brief explanation of the IF shifting operation will be given.

The IF shift is an operation to change the center frequency of an IF filter when receiving single side band (hereinafter "SSB") or continuous wave (hereinafter "CW") signals. Also, the same result can be attained by simultaneously changing the receiving intermediate frequency and the frequency of beat frequency oscillator (hereinafter "BFO"), while fixing the center frequency of the IF filter and maintaining the difference between said two frequencies constant.

Therefore, if there is any undesired signal in the adjacence of the desired signal in the IF filter pass band, the undesired signal can effectively be eliminated outside the pass band by shifting, or equivalently shifting, the frequency of the filter. In the figure, a solid line indicates the transmitting route, and a dotted line the receiving route.

The transmitting route will be described first. The voice signal from a microphone 1 is amplified by a microphone amplifier 2 and modulated by a balanced modulator 3, whence it is passed through an IF filter 4 and an IF amplifier 5 to a mixer 6 where it is mixed with the local oscillation frequency. The resulting transmitting frequency is emitted from an antenna A, by way of a drive stage 7 and a final stage 8. The symbol SW denotes a switch for shifting the antenna A for transmitting and receiving.

The receiving route will now be described. The received signal from the antenna A is amplified by a radio frequency (hereinafter "RF") amplifier, and then mixed with the local oscillation frequency is a mixer 10. The resulting IF is passed through the IF filter 4 and IF amplifier 5 (commonly used for transmitting and receiving), and further through an IF amplifier 11. Then it is detected in a detector 12 by means of the frequency of BFO, amplified by an audio frequency (hereinafter "AF") amplifier 13, and reproduced into audible sound by a speaker 14.

Now the construction of a local oscillator circuit (hereinafter "L-OSC") to generate the local oscillation frequency, utilizing a PLL circuit, will be described. In the L-OSC, the frequency from a VFO 15 is applied to a phase comparator 16 as the reference frequency. The comparison signal from this phase comparator 16 controls a voltage-controlled oscillator 19, stabilizes the frequency oscillated thereby, and is fed to the transmitting and receiving mixers 6 and 10 through a buffer amplifier 20. The output from the voltage-controlled oscillator 19 is mixed in a mixer 18 with the frequency emerging from a first oscillator circuit 21, and then in a mixer 17 with part of the frequency from a second oscillator circuit 22 that is to become the carrier or the beat frequency. The mixed frequency is applied to the phase comparator 16, and its phase is compared with that of said VFO frequency. The PLL circuit thus consists of the aforesaid circuits 15 through 22.

The output frequency from the second oscillator circuit 22 is used as the output of BFO, and also as the output of a transmitting carrier through a switching circuit 23, and is applied to the detector 12 and the balanced modulator 3, as illustrated.

Reference numeral 24 designates a carrier oscillator circuit that is separately provided as a substitute for the transmitting carrier. In this embodiment, its output is used for receiving the CW signals, applied in place of the output from the second oscillator circuit 22 by the shifting of the switching circuit 23. Also in this embodiment, mixing is effected twice, in the mixers 17 and 18. But, needless to say, the mixer 18 and the first oscillator circuit 21 may be omitted if the frequencies of the PLL circuit are suitably set up.

The following is a description of the operation of this embodiment having the above-described construction. If the IF frequency is 8.0 MHz and the received frequency is between 14.0 and 14.5 MHz, the local oscillation frequency obtained by a single conversion is either between 22.0 and 22.5 MHz, or between 6.0 and 6.5 MHz. If the upper side is taken, the voltage-controlled oscillator 19 is required to generate the frequency between 22.0 and 22.5 MHz. Assuming here that the reference frequency from the VFO 15 is between 5.0 and 5.5 MHz, the frequency from the first oscillator circuit 21 becomes 19.5 MHz, which is mixed in the mixer 17 with the frequency of 8.0 MHz from the second oscillator 22 to form the frequency of 5.5 MHz that is fed to the phase comparator 16. More specifically, the procedure in the mixer 18 is (22.0 to 22.5) − 19.5 = 2.5 to 3.0 MHz, and the procedure in the mixer 17 is 8.0 − (2.5 to 3.0) = 5.0 to 5.5 MHz. Since the latter frequency is synchronous to the output (5.0 to 5.5 MHz) of the VFO 15, the frequency of the voltage-controlled oscillator 19 is fixed at 22.0 MHz.

Here, the aforesaid IF shifting operation may be performed by shifting the frequency (8.0 MHz) from the second oscillator 22 by several KHz, either upward or downward. For example, if the frequency of 8.0 MHz is raised by 1 KHz, the output of the mixer 17 becomes 1 KHz higher, and so do the local oscillation frequency generated by the voltage-controlled oscillator 19 and the signal whose IF is shifted by the mixer 10. Because the frequency of the received signal and the BFO frequency have the constant frequency pitch, the above-mentioned step equivalently lowers the frequency of the IF filter 4 by 1 KHz, thereby eliminating the undesired signals as described previously.

The carrier oscillator frequency may be lowered by 1 KHz, too. Further, spread of the shifting range permits switching between the LSB and the USB (or the CW). Besides, only one dial pointer is enough to read the frequency of the received signal since it is kept constant.

It is also possible to effect phase comparison not only at 8.0 MHz by replacing the VFO 15 with the second oscillator 22, but also at between 2.5 and 3.0 MHz by mixing the outputs of the BFO 15 and the second oscillator 22.

Now reference is made to the CW reception. In the case of CW, the zero-beat condition permitting no demodulation occurs if the receiving and transmitting frequencies are perfectly the same. So they are usually staggered from each other by 700 to 800 Hz. The embodiment of this invention is so designed as to obtain the carrier frequency for transmitting by means of a separate CW carrier oscillator 24, because the staggering of the carrier oscillator frequency does not lead to a change in the transmitting frequency, and, in the indication of the CW frequencies, the received signal must be expressed in terms of the carrier frequency and the transmitted signal in terms of the actual transmitting frequency. In order that it is separatable from the second oscillator 22, the CW carrier oscillator 24 is disposed by way of the electronic switching circuit 23. In this embodiment, the frequency of the CW carrier oscillator is set at 8.0008 MHz, staggered by 800 Hz.

In the case of FSK (frequency-shift keying) too, the same CW carrier oscillator 24 is used for shifting the frequency when transmitting.

As can be seen from the above description, the inventive frequency-synthesizer type transceiver with the above-described construction and operation will provide the following advantages:

(a) to enable the IF shifting operation that is effective for the elimination of undesired signal, (b) to permit reading the frequency of the received signal with one dial pointer, since the indicated carrier frequency does not change even when the reception mode is changed among USB, LSB and CW, (c) to change the characteristics of the transmitting frequency response without changing the transmitting frequency by effecting the IF shifting when transmitting, (d) to greatly reduce spurious response in both transmission and reception by means of local oscillations resulting from the use of the PLL circuit, (e) to offer great cost and space advantages, since the above-mentioned functions (b) and (d) are performed by a single IF filter.

It should be understood that the above invention, even though described in conjunction with a preferred embodiment, will include variations and modifications which fall within the scope of the invention. All such variations and modifications are contemplated as falling within the scope of the appended claims.

We claim:

1. A phase-locked loop circuit for a frequency-synthesizer type transceiver comprising:
   (a) an oscillator for producing a reference frequency,
   (b) a voltage controlled oscillator for producing an output frequency,
   (c) a first oscillator circuit for producing a designated frequency,
   (d) first combining means for combining the output frequency with the designated frequency and forming a first mixed frequency,
   (e) a second oscillator circuit for producing a carrier frequency,
   (f) second combining means for combining the carrier frequency with the first mixed frequency and forming a second mixed frequency,
   (g) comparing means for comparing the phases of the second mixed frequency and the reference frequency and producing a comparison signal, and
   (h) the voltage-controlled oscillator being connected to the comparing means for receiving the comparison signal, whereby said signal regulates the output frequency produced by the voltage-controlled oscillator.

2. The circuit in claim 1, further comprising a carrier oscillating circuit connected to the second oscillating circuit, the carrier oscillating circuit including a continuous wave frequency oscillator and an electric switching means for selectively switching from one carrier frequency to another to differentiate the transmitting and receiving frequencies.

* * * * *

UNITED STATES PATENT AND TRADEMARK OFFICE
CERTIFICATE OF CORRECTION

PATENT NO. : 4,097,805
DATED : June 27, 1978
INVENTOR(S) : Motoyuki Fujii et al.

It is certified that error appears in the above-identified patent and that said Letters Patent are hereby corrected as shown below:

On the Title Page Assignee should read

-- Trio Kabushiki Kaisha, Toyko, Japan --.

Signed and Sealed this

Seventh Day of August 1979

[SEAL]

Attest:

*Attesting Officer*

LUTRELLE F. PARKER
*Acting Commissioner of Patents and Trademarks*